(12) United States Patent
Hiller et al.

(10) Patent No.: US 8,611,114 B2
(45) Date of Patent: *Dec. 17, 2013

(54) REDUNDANT CONTROL METHOD FOR A POLYPHASE CONVERTER WITH DISTRIBUTED ENERGY STORES

(75) Inventors: Marc Hiller, Lauf an der Pegnitz (DE); Dietmar Krug, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 125 days.

This patent is subject to a terminal disclaimer.

(21) Appl. No.: 13/057,595

(22) PCT Filed: May 14, 2009

(86) PCT No.: PCT/EP2009/055812
§ 371 (c)(1),
(2), (4) Date: Feb. 4, 2011

(87) PCT Pub. No.: WO2010/015431
PCT Pub. Date: Feb. 11, 2010

(65) Prior Publication Data
US 2011/0134667 A1 Jun. 9, 2011

(30) Foreign Application Priority Data
Aug. 7, 2008 (DE) .......................... 10 2008 036 810

(51) Int. Cl.
*H02H 7/122* (2006.01)
(52) U.S. Cl.
USPC ................................ 363/55; 363/71; 363/131
(58) Field of Classification Search
USPC ................. 363/13, 34, 35, 37–41, 55, 64, 65, 363/71–79, 97, 98, 131, 132
See application file for complete search history.

(56) References Cited

U.S. PATENT DOCUMENTS 5,986,909 A 11/1999 Aiello
2011/0134666 A1* 6/2011 Hiller et al. ..................... 363/55

FOREIGN PATENT DOCUMENTS

| CN | 1244745 A | 2/2000 |
|---|---|---|
| DE | 101 03 031 A1 | 7/2002 |

(Continued)

OTHER PUBLICATIONS

A. Lesnicar, R. Marquardt IEEE Bologna PowerTech Conference, Jun. 23-26, 2003, Bologna Italy; Others.

(Continued)

*Primary Examiner* — Adolf Berhane
*Assistant Examiner* — Yemane Mehari
(74) *Attorney, Agent, or Firm* — Henry M. Feiereisen LLC (57) ABSTRACT

A method for controlling an inverter having at least two phase modules having respective upper and lower valve branches with at least three two-pole subsystems connected in series, includes in the event of failure of at least one subsystem in a faulty valve branch of a defective phase module the following method steps: a) identifying the faulty a defective upper or lower valve branch in the identified defective phase module in which one or more subsystems have failed; b) controlling a terminal voltage of the one or more failed subsystems in the faulty valve branch so as to be permanently zero; and c) controlling in each of the upper and lower fault-free valve branches having fault-free subsystems a number of fault-free subsystems corresponding to the one or more failed subsystems such that their terminal voltages of the controlled fault-free subsystems terminal voltages are permanently zero.

2 Claims, 5 Drawing Sheets

(56) References Cited

FOREIGN PATENT DOCUMENTS

| DE | 10 2005 040 543 A1 | | 3/2007 |
|---|---|---|---|
| DE | 10 2005 045 091 A1 | | 3/2007 |
| DE | 102005045091 A1 | * | 3/2007 |
| DE | 10 2005 045 090 B4 | | 8/2007 |

OTHER PUBLICATIONS

IEEE Ind. Appl. Magazine, IEEE Service Center, Piscataway, NJ, US, Bd. 9, Nr. 6, Nov. 1, 2003, Seiten 40 bis 49; Others.

* cited by examiner

REDUNDANT CONTROL METHOD FOR A POLYPHASE CONVERTER WITH DISTRIBUTED ENERGY STORES

CROSS-REFERENCES TO RELATED APPLICATIONS

This application is the U.S. National Stage of International Application No. PCT/EP2009/055812, filed May 14, 2009, which designated the United States and has been published as International Publication No. WO 2010/015431 and which claims the priority of German Patent Application, Serial No. 10 2008 036 810.5, filed Aug. 7, 2008, pursuant to 35 U.S.C. 119(a)-(d).

BACKGROUND OF THE INVENTION

The invention relates to a method for controlling a converter with distributed energy stores.

DE 101 03 031 A1 discloses a converter with distributed energy stores. An equivalent circuit of a converter such as this is shown in more detail in FIG. 1. According to this equivalent circuit, this known converter has three phase modules, which are each annotated 100. These phase modules 100 are each electrically conductively connected on the DC voltage side to a positive and a negative DC voltage busbar $P_0$ and $N_0$. In the case of a voltage intermediate-circuit converter, a series circuit of two capacitors C1 and C2, across which a DC voltage $U_d$ is dropped, would be connected between these two DC voltage busbars $P_0$ and $N_0$. A connection point between these two capacitors C1 and C2, which are electrically connected in series, forms a virtual neutral point O. Each phase module 100 which forms a bridge arm of the polyphase converter has an upper and a lower bridge arm element, which are referred to in the following text as the respective valve arms T1, T3 and T5 as well as T2, T4 and T6, since the bridge arm elements each represent a converter valve of the polyphase converter with distributed energy stores. Each of these valve arms T1 to T6 has a number of two-pole subsystems 10 which are electrically connected in series. In this equivalent circuit, four of these subsystems 10 are shown. The number of subsystems 10 per valve arm T1, . . . , T6 is, however, not restricted to this illustrated number. Each junction point between two valve arms T1 and T2; T3 and T4 as well as T5 and T6 of a phase module 100 forms a respective connection L1, L2 and L3 on the AC voltage side of a phase module 100. Since, in this illustration, the converter has three phase modules 100, a three-phase load, for example a polyphase motor, can be connected to their connections L1, L2 and L3 on the AC voltage side, also referred to as load connections.

Figure 2:
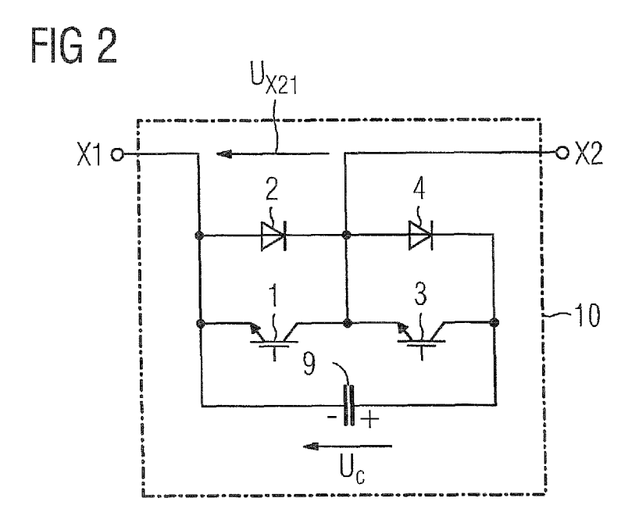
FIG. 2 shows an equivalent circuit of a first embodiment of a known two-pole subsystem in the converter shown in FIG. 1.
Figure 3:
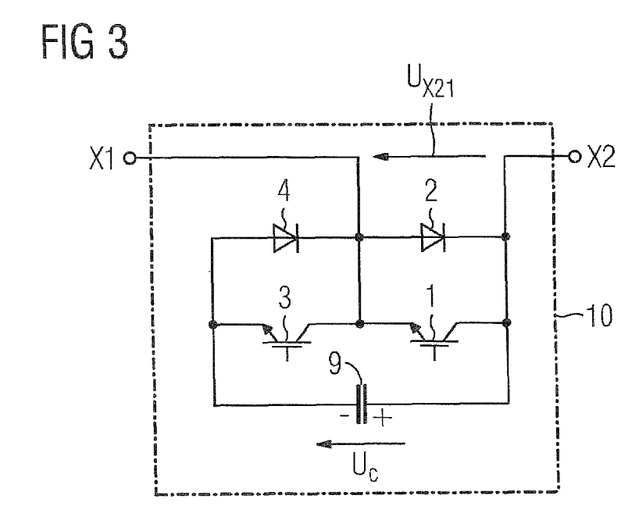
FIG. 3 shows an equivalent circuit of a second embodiment of a known two-pole subsystem in the converter as shown in FIG. 1.

FIG. 2 shows an equivalent circuit of one known embodiment of a two-pole subsystem 10 in more detail. The circuit arrangement shown in FIG. 3 represents a functionally completely equivalent variant. Both embodiments of a two-pole subsystem 10 are known from DE 101 03 031 A1. These known two-pole subsystems 10 each have two semiconductor switches 1 and 3 which can be turned off, in each case two diodes 2 and 4 and in each case one unipolar energy storage capacitor 9. The two semiconductor switches 1 and 3 which can be turned off are electrically connected in series, with this series circuit being connected electrically in parallel with the energy storage capacitor 9. One of the two diodes 2 and 4 is electrically connected in parallel with each semiconductor switch 1 and 3 which can be turned off such that these diodes 2 and 4 are connected back-to-back in parallel with the corresponding semiconductor switch 1 or 3 which can be turned off. The unipolar energy storage capacitor 9 in the subsystem 10 consists either of a capacitor or of a capacitor bank composed of a plurality of such capacitors having a resulting capacitance $C_0$. The connection point between the emitter of the semiconductor switch 1 which can be turned off and the anode of the diode 2 forms a connecting terminal X1 of the subsystem 10. The connection point between the two semiconductor switches 1 and 3 which can be turned off and the two diodes 2 and 4 forms a second connecting terminal X2 of the subsystem 10.

In the embodiment of the two-pole subsystem 10 shown in FIG. 3, this connection point forms the first connecting terminal X1. The connection point between the collector of the semiconductor switch 1 which can be turned off and the cathode of the diode 2 forms the second connecting terminal X2 of the subsystem 10.

In both illustrations of the two embodiments of the two-pole subsystem 10, Insulated Gate Bipolar Transistors (IGBT) are used as the semiconductor switches 1 and 3 which can be turned off as shown in FIGS. 2 and 3. It is likewise possible to use MOS Field-Effect Transistors, also referred to as MOSFETs. It is also possible to use Gate Turn Off Thyristors, also referred as GTO thyristors, or Integrated Gate Commutated Thyristors (IGCT).

Figure 1:
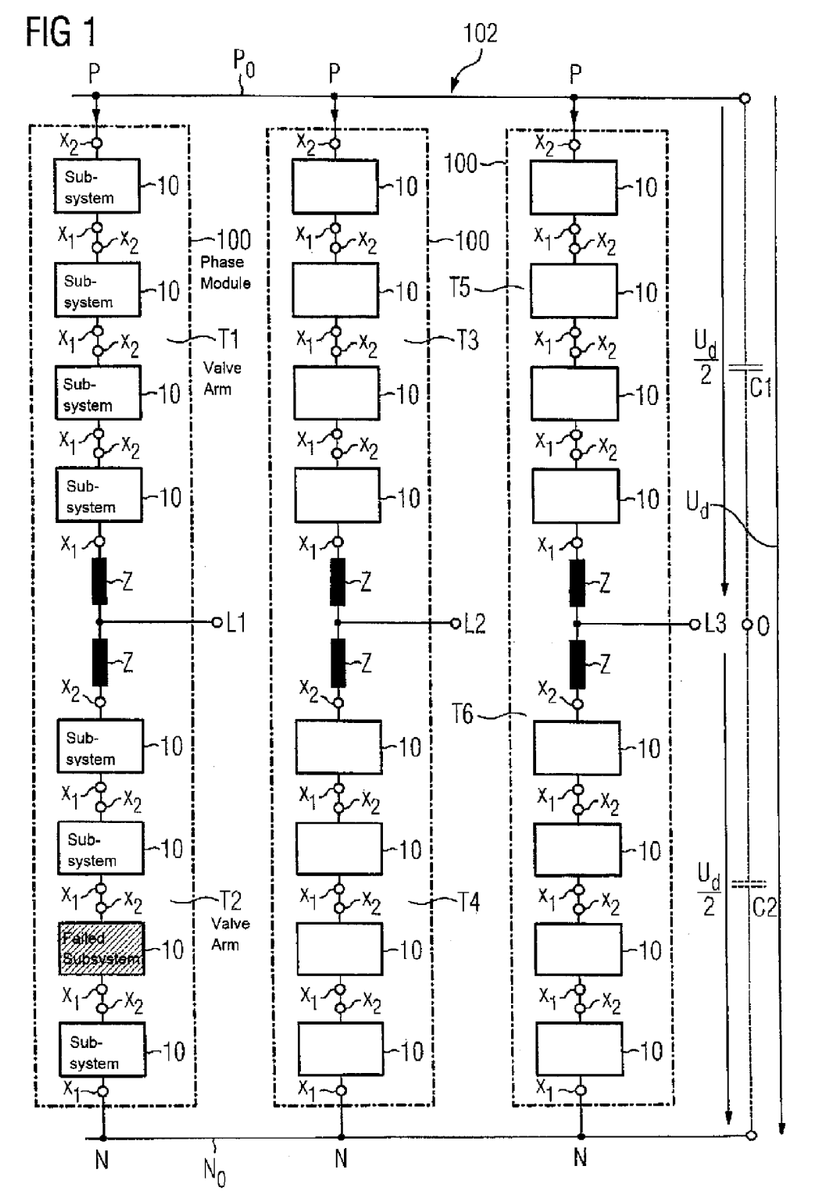
FIG. 1 shows an equivalent circuit of a known converter with distributed energy stores.

According to DE 101 03 031 A1, the two-pole subsystems 10 in each phase module 100 of the converter as shown in FIG. 1 are switched to a switching state I, II and III. In the switching state I, the semiconductor switch 1 which can be turned off is switched on, and the semiconductor switch 3 which can be turned off is switched off. The terminal voltage $U_{X21}$ which is present at the connecting terminals X1 and X2 in the two-pole subsystem 10 is therefore equal to zero. In the switching state II, the semiconductor switch 1 which can be turned off is switched off, and the semiconductor switch 3 which can be turned off is switched on. In this switching state II, the terminal voltage $U_{X21}$ which is present is equal to the capacitor voltage $U_C$ across the energy storage capacitor 9. In the switching state III, both semiconductor switches 1 and 3 which can be turned off are switched off, and the capacitor voltage $U_C$ across the energy storage capacitor 9 is constant.

In order to allow this converter to operate in redundant form with distributed energy stores 9 as shown in FIG. 1, it is necessary to ensure that a faulty subsystem 10 is permanently short-circuited at its terminals X1 and X2. This means that the terminal voltage $U_{X21}$ of the faulty subsystem 10 is zero irrespective of the current direction through the terminals X1 and X2.

The failure of one of the semiconductor switches 1 and 3 which can be turned off and are present in the subsystem 10, or of an associated control circuit, results in this subsystem 10 not operating correctly. Further possible causes of malfunctions are, inter alia, faults in the associated control circuit for the semiconductor switches, their power supply, communication and measured-value detection. That is to say, the two-pole subsystem 10 can no longer be controlled as desired in one of the possible switching states I, II or III. The short-circuiting of the subsystem 10 at its connections X1 and X2 means that no more power is supplied to this subsystem 10. This reliably precludes consequential damage such as overheating and fire resulting from continued operation of the converter.

A conductive connection like a short circuit such as this between the connecting terminals X1 and X2 of a faulty two-pole subsystem 10 has to reliably carry at least the operating current of one valve arm T1, . . . , T6 in the phase module 100 in which the faulty two-pole subsystem 10 is connected, without overheating. DE 10 2005 040 543 A1 discloses how a faulty subsystem 10 can be reliably short-circuited in order that this known converter with distributed energy stores can continue to be operated in a redundant form.

Figure 4:
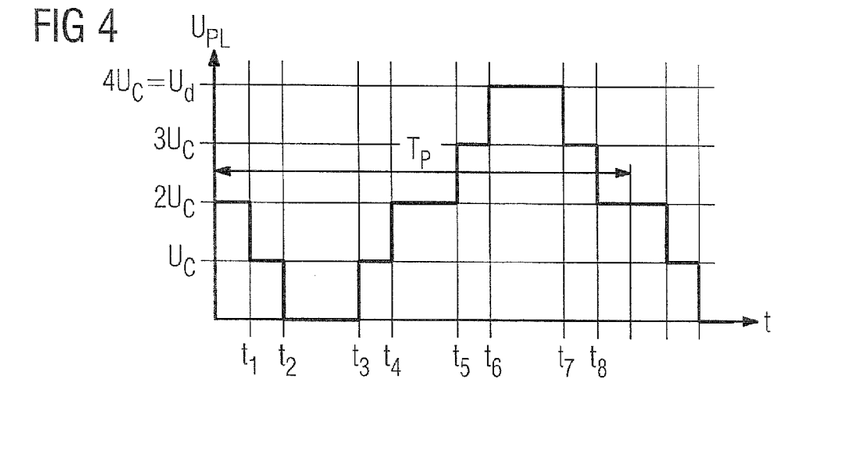
FIGS. 4-6 show potential profiles of a phase module of a converter as shown in FIG. 1 when no faults are present, in each case in the form of a graph plotted against the time t.
Figure 5:
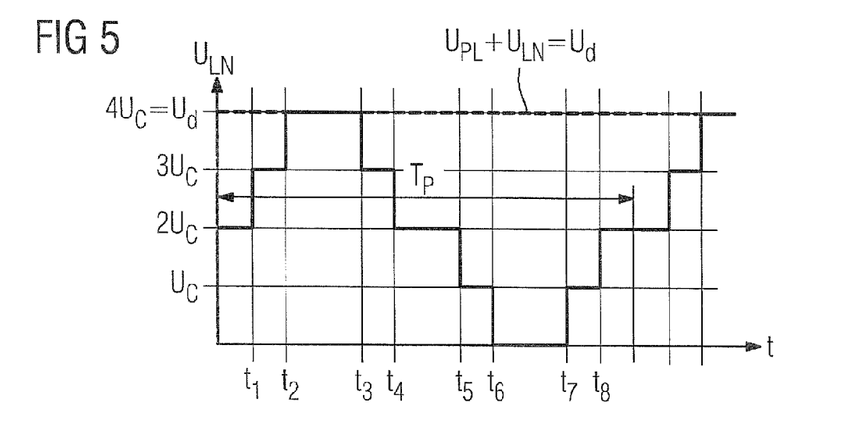

The following explanation is based on the assumption that the energy storage capacitors 9 in all of the two-pole subsystems 10 each have the same voltage $U_C$. Methods for initially producing this state and for maintaining it during operation are likewise known from DE 101 03 031 A1. FIG. 4 shows a graph of a profile of the potential difference $U_{PL}$ between the terminal P of a phase module 100 and a grid connection L, plotted against the time t. FIG. 5 shows a graph of a profile of the potential difference $U_{LN}$ between the terminal L and the potential at the terminal N, plotted against the time t. According to these potential profiles $U_{PL}$ and $U_{LN}$, in each case one subsystem of the eight two-pole subsystems 10 of the valve arms T1 and T2 is connected or disconnected at each of the times t1, t2, t3, t4, t5, t6, t7 and t8. Switching on in this case corresponds to a change from the switching state I to the switching state II. Turning off corresponds to a change from the switching state II to the switching state I. These two graphs each show one period $T_P$ of a fundamental oscillation of the potential profile $u_{LO}$ (FIG. 6) between the load connection L and the virtual neutral point O of a phase module 100 of the converter with distributed energy stores 9, for the potential profiles $U_{PL}$ and $U_{LN}$.

Figure 6:
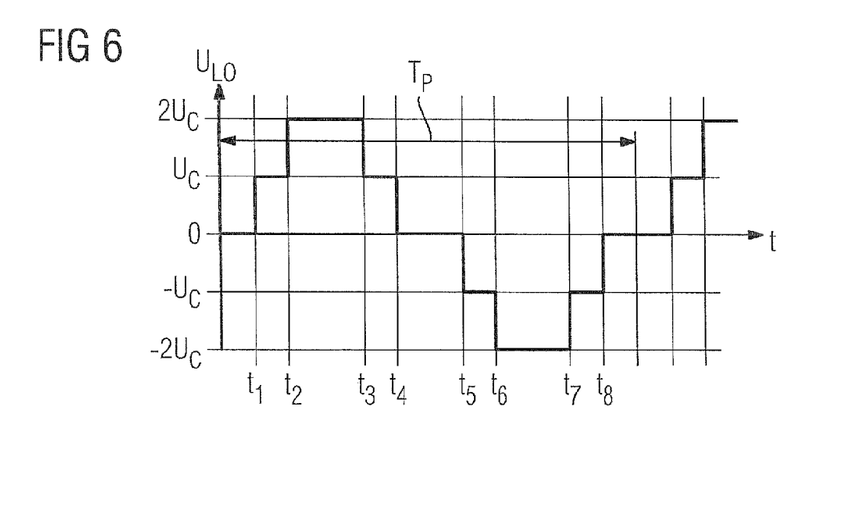

FIG. 6 shows a profile of the difference between the potential profiles $U_{LN}$ and $U_{PL}$ as shown in FIGS. 4 and 5, in the form of a graph plotted against the time t. This resultant potential profile $U_{LO}$ occurs between a connection L1, L2 or L3 on the AC voltage side of a phase module 100 in the converter with distributed energy stores 9 as shown in FIG. 1 and an arbitrarily selected potential of a virtual neutral point O of a voltage intermediate circuit having two capacitors C1 and C2. Corresponding components of harmonics or DC voltage components in each of the output voltages $U_{LO}$ of the phase modules 100 in the polyphase converter with distributed energy stores 9 as shown in FIG. 1 are resolved in the case of a balanced polyphase voltage system in the difference voltages between in each case two phase-shifted output voltages $U_{L10}$, $U_{L20}$ or $U_{L30}$. These two potential profiles $U_{PL}$ and $U_{LN}$ likewise show that the sum of the potentials at any time is $4 \cdot U_C$. This means that the value of the DC voltage $U_d$ between the DC voltage busbars $P_0$ and $N_0$ always corresponds to a constant number of subsystems 10 in the switching state II multiplied by the value of the capacitor voltage $U_C$ across the capacitor 9. In the situation illustrated by way of example, this number corresponds to the number of two-pole subsystems 10 in the valve arms T1, ..., T6 in the converter as shown in FIG. 1.

DE 10 2005 045 091 A1 discloses a method for controlling a converter with distributed energy stores as shown in FIG. 1, by means of which the balance conditions are maintained in the event of a malfunction of at least one subsystem in a phase module of this converter. According to this known method, one valve arm of one of the three phases in which one or more of the two-pole subsystems is or are faulty is first of all determined. Each faulty subsystem is controlled such that the amplitude of the terminal voltage is in each case zero. A number of subsystems corresponding to the number of determined two-pole subsystems in a further valve arm of the faulty phase module are controlled such that the amplitude of the terminal voltage is in each case equal to a capacitor voltage. This control of the subsystems in the faulty phase module is likewise carried out in subsystems in the valve arms of the sound phase modules.

Figure 7:
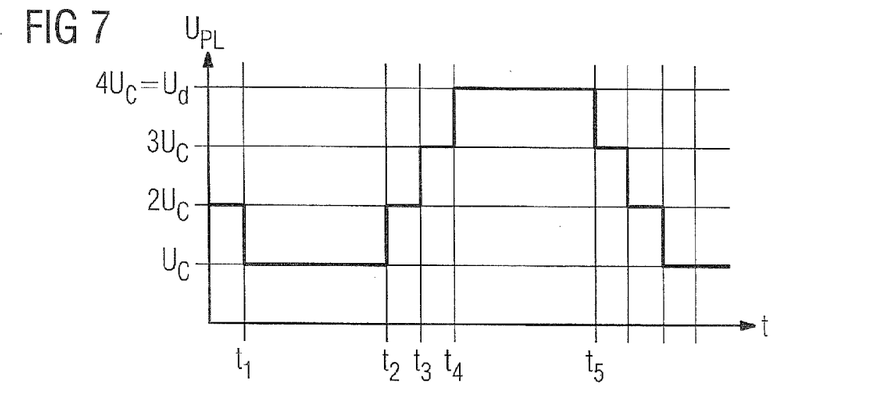
FIGS. 7-9 show potential profiles of a phase module in a converter as shown in FIG. 1 when a fault is present, in each case in the form of a graph plotted against the time t.
Figure 8:
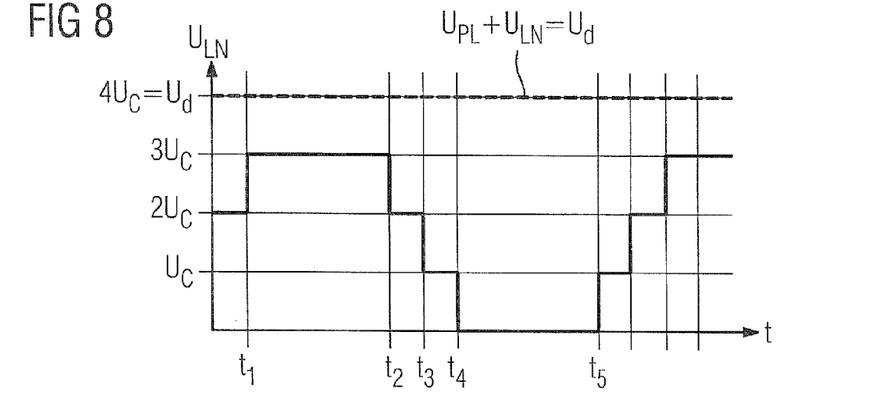

FIG. 7 shows a graph of a profile of the potential difference $U_{PL1}$ between the terminal P in a phase module 100 and a load connection L in a phase module 100, plotted against the time t, with one faulty two-pole subsystem 10 in the lower valve arm T2 and T4 and T6 in a phase module 100. FIG. 8 shows a graph of a profile of the potential difference $U_{L1N}$ between the terminal L and the potential of the terminal N, plotted against the time t. As can be seen from the profile of the potential difference $U_{PL}$ in FIG. 7, a subsystem 10 in each upper valve arm T1 and T3 and T5 of each phase module 100 is controlled such that its terminal voltage $U_{X21}$ is always equal to the capacitor voltage $U_C$ across the energy storage capacitor 9. Of the four subsystems 10 illustrated by way of example in each upper valve arm T1 and T3 and T5, there are now only three remaining subsystems 10 which are connected and disconnected. As can be seen from the time profile of the potential difference $U_{LN}$ of each lower valve arm T2 and T4 and T6 in each phase module 100, in each case one of the four subsystems 10 illustrated by way of example is controlled such that its terminal voltage $U_{X21}$ is always equal to zero. As shown in FIG. 1, of these lower valve arms T2, T4 and T6 in the three phase modules 100, the valve arm T2 has a faulty two-pole subsystem 10, identified by shading. The value of the amplitudes of the voltage $U_{LN}$ of each valve arm T2, T4 and T6 can therefore now be only at most $3 \cdot U_C$. This known method results in the number of subsystems 10 used in the event of a fault being equal to the number of subsystems 10 used when no faults are present. The profile of the amplitude of the sum of the potential differences $U_{PL}$ and $U_{LN}$ is shown by means of a dashed line in the graph in FIG. 8. In comparison to the situation when there are no faults, the voltages $U_{L10}$, $U_{L20}$ and $U_{L30}$ each have a lower maximum amplitude when a fault is present. In the illustrated example, these voltages $U_{L10}$, $U_{L20}$ and $U_{L30}$ when no fault is present have a maximum voltage amplitude of $½ \cdot U_d$ each, while in contrast the maximum amplitude when a fault is present is only $⅜ \cdot U_d$. This means that this known method results in a balanced three-phase voltage system, with a lower maximum amplitude, when a fault is present.

Figure 9:
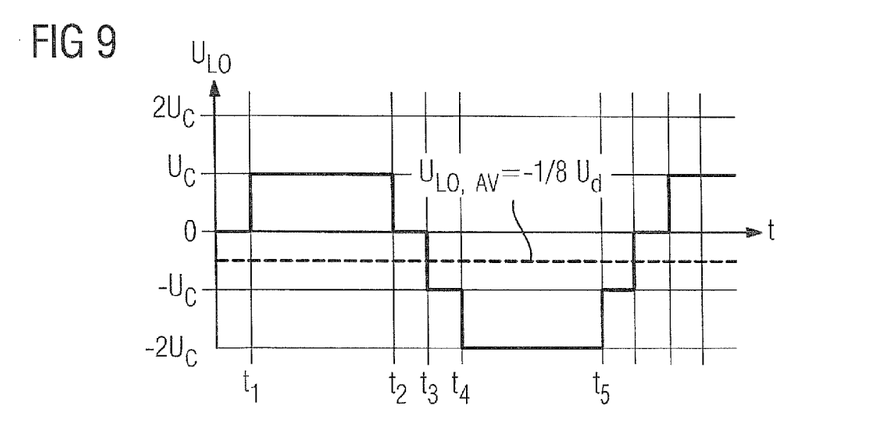

FIG. 9 shows a profile of the difference in the voltage differences $U_{PL}$ and $U_{LN}$ as shown in FIGS. 7 and 8, plotted against the time t. As can be seen from this time profile of the potential between the load connection L1 or L2 or L3 and a virtual neutral point O, this potential no longer oscillates symmetrically about a null position. This null position is shifted through $⅛ \cdot U_d$. This means that this potential profile has a DC component.

SUMMARY OF THE INVENTION

The invention is now based on the object of developing the known control method such that no DC voltage components any longer occur in the output voltages of the converter with distributed energy stores when a fault occurs.

This object is achieved according to the invention by a method for controlling an inverter having at least two phase modules which have an upper and a lower valve branch, which each have at least three two-pole subsystems, which are connected in series, in the event of failure of at least one subsystem of a valve branch, wherein the valve branch with the failed subsystem is determined, and wherein one subsystem of a valve branch which corresponds to the failed valve branch in each fault-free phase module is in each case controlled such that its terminal voltages are in each case zero, wherein one subsystem of a valve branch which corresponds to the failed valve branch in the failed phase module is controlled such that its output voltage is equal to zero, and such that one subsystem of a valve branch which corresponds to this valve branch in each fault-free phase module is in each case controlled such that its terminal voltages are equal to zero.

Since a number of two-pole subsystems, with this number corresponding to the number of faulty subsystems, are controlled in a valve arm of a faulty phase module corresponding to the faulty valve arm, such that the amplitudes of their terminal voltages are equal to zero, the output voltage of the faulty phase module no longer has a DC component. Because of the symmetry condition, corresponding subsystems in the valve arms of the sound phase modules are controlled in a corresponding manner. This therefore results in a three-phase balanced voltage system with no DC voltage component.

BRIEF DESCRIPTION OF THE DRAWING

In order to explain the invention further, reference is made to the drawing, which schematically illustrates one embodiment of a method according to the invention for controlling a multi-phase converter with distributed energy stores.

DETAILED DESCRIPTION OF PREFERRED EMBODIMENTS

It is now assumed that one two-pole subsystem 10 in the valve arm T2 of the phase module 100 in the converter with distributed energy stores 9 as shown in FIG. 1 has been safely short-circuited because of some fault. This faulty two-pole subsystem 10 is indicated by means of shading in the equivalent circuit shown in FIG. 1.

According to the method according to the invention, this faulty two-pole subsystem 10 must first of all be determined. Once this faulty subsystem 10 has been determined, this subsystem 10 is controlled such that the amplitude of the associated terminal voltage $U_{x21}$ is zero. This phase module 100, in which the valve arm T2 has a faulty subsystem 10, is referred to in the following text as the faulty phase module 100. Furthermore, this faulty phase module 100 has a valve arm T1 in which there is no faulty subsystem 10. According to the method according to the invention, a corresponding number of two-pole subsystems 10 in the sound valve arm T1 of this faulty phase module 100, which number corresponds to the number of faulty subsystems 10 in the faulty valve arm T2, are controlled such that the amplitude of the terminal voltage $U_{x21}$ is in each case equal to zero. Since, in this example, only one two-pole subsystem 10 in the valve arm T2 is faulty, only one two-pole subsystem 10 is controlled in the associated valve arm T1 of the faulty phase module 100 such that the amplitude of its terminal voltage $U_{x21}$ is equal to zero.

Figure 10:
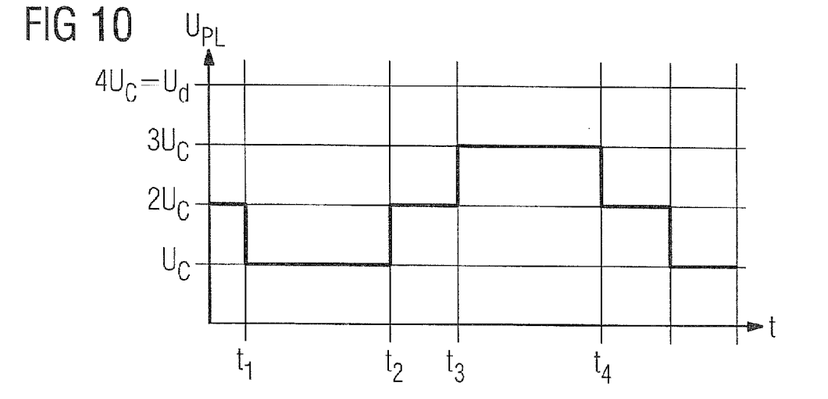
FIGS. 10-12 illustrate voltage profiles of a faulty phase module in a converter as shown in FIG. 1, in each case in the form of a graph plotted against the time t, generated by means of the method according to the invention.
Figure 11:
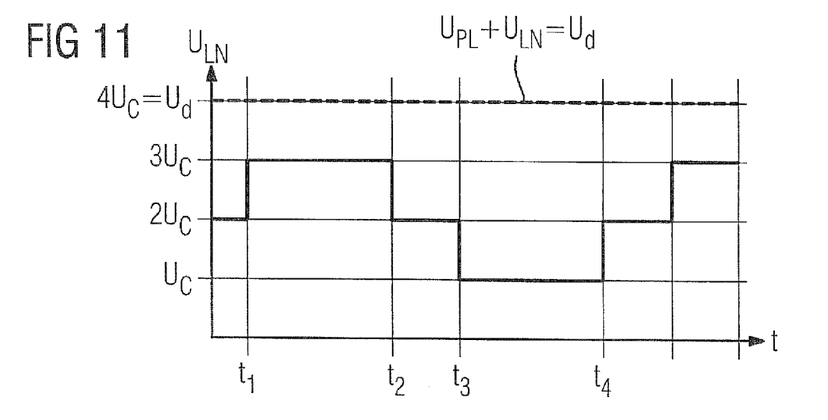

FIG. 10 shows a diagram plotted against the time t of the time profile of the potential difference $U_{PL}$ at the terminal P with respect to a load connection L1. FIG. 11 shows a diagram plotted against the time t of the time profile of the potential difference $U_{LN}$ of the terminal L with respect to the potential of the terminal N. As can be seen from the two potential profiles $U_{PL}$ and $U_{LN}$, only three subsystems 10 of the four two-pole subsystems 10 in the valve arms T1 and T2 are available for control purposes. The sum of these two potential profiles $U_{PL}$ and $U_{LN}$ once again results in a DC voltage $U_d$, which is present between the DC voltage busbars $P_0$ and $N_0$ of this converter with distributed energy stores 9 as shown in FIG. 1. This means that the DC voltage $U_d$ is the same whether or not there are any faults. For balance reasons, the two-pole subsystems 10 in the valve arms T4, T3 and T6, T5 of the two sound phase modules 100 in the converter with distributed energy stores 9 as shown in FIG. 1 are controlled in a corresponding manner. This means that a number of subsystems 10, which number corresponds to the number of faulty subsystems 10, are controlled in the sound valve arms T4 and T6 of the sound phase modules 100 of the converter as shown in FIG. 1, which valve arms T4 and T6 correspond to the faulty valve arm T2 in the faulty phase module 100, are controlled such that the amplitudes of their terminal voltages $U_{x21}$ are each zero. Since only one subsystem 10 is faulty in the faulty valve arm T2 of the faulty phase module 100, only one two-pole subsystem 10 is in each case controlled in valve arms T4 and T6, which correspond to the valve arm T2, in the sound phase module 100 of the converter with distributed energy stores 9 as shown in FIG. 1, such that the amplitudes of the terminal voltages $U_{x21}$ are in each case zero. One subsystem 10 in the faulty phase module 100 in the sound valve arm T1 is likewise controlled such that the amplitude of the associated terminal voltage $U_{x21}$ is zero. This means that the number of faulty subsystems 10 in the faulty valve arm T2 in the sound phase modules 100 of the converter with distributed energy stores 9 as shown in FIG. 1 are controlled in the valve arms T3 and T5, which correspond to the sound valve arm T1 of the faulty phase module 100, in the sound phase modules 100 of subsystems 10 in each case, such that the amplitudes of their terminal voltages $U_{x21}$ are likewise equal to zero.

Figure 12:
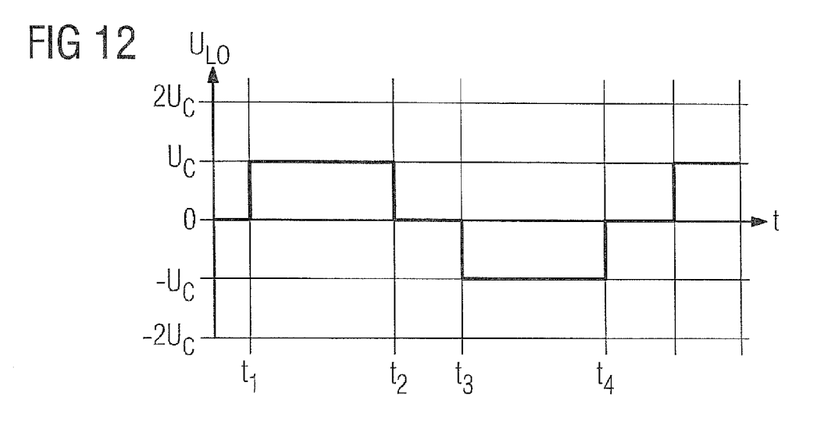

Such control of two-pole subsystems 10 in the converter with distributed energy stores 9 results in output voltages $U_{L10}$, $U_{L20}$ and $U_{L30}$, which are respectively present between a connection L1, L2 and L3 on the AC voltage side, and a virtual neutral point O. These output voltages $U_{L10}$, $U_{L20}$ and $U_{L30}$ have a potential profile $U_{L0}$ which is illustrated in a diagram plotted against the time t in FIG. 12. This profile no longer has any DC component. The amplitudes of these output voltages $U_{L10}$, $U_{L20}$ and $U_{L30}$ are respectively less than the amplitudes of the output voltages which have been generated by means of the known control method. According to the example of four subsystems 10 per valve arm T1, . . . , T6, the output voltages $U_{L10}$, $U_{L20}$ each have an amplitude of ¼·$U_d$ in comparison to an amplitude of ⅜·$U_d$ (known control method). Instead this balanced three-phase voltage system with a lower amplitude has no DC voltage component.

The DC component which occurs in the output voltages $U_{L10}$, $U_{L20}$ and $U_{L30}$ of the converter with distributed energy stores 9 in the known method, as shown in FIG. 1, causes a shift in the starpoint in a connected rotating-field machine, which can lead to bearing currents. Furthermore, when using the converter as an active, direct power supply system feed, said DC component causes a shift in the potential of the converter with respect to ground potential when the starpoint on the power supply system side is grounded. In some circumstances, this requires additional complexity for the insulation of the converter. The method according to the invention overcomes this disadvantage, although it must be accepted that the amplitudes of the output voltages $U_{L10}$, $U_{L20}$ and $U_{L30}$ of the converter as shown in FIG. 1 will be lower. The greater the number of two-pole subsystems 10 which are used in the valve arms T1, ..., T6, the more finely graduated are the output voltages $U_{L10}$, $U_{L20}$ and $U_{L30}$ of the converter with distributed energy stores 9 as shown in FIG. 1. This makes it possible to approximate to a sinusoidal profile even with faulty two-pole subsystems 10.

The invention claimed is:

1. A method for controlling an inverter having at least two phase modules (100), with each phase module (100) having an upper valve branch (T1, T3, T5) and a lower valve branch (T2, T4, T6), and with each valve branch (T1 ... T6) having at least three two-pole subsystems (10) connected in series, with the following method steps in the event Of failure of at least one subsystem (10-1-2) in a fault~valve branch (T2) of a defective phase module (101):
 a) identifying the faulty valve branch (T2) in the identified defective phase module (101) in which the at least one subsystem (10T2) has failed;
 b) controlling a terminal voltage of the at least one failed subsystem (10T2) in the faulty valve branch (T2) so as to be permanently zero; and
 c) controlling each of the upper and lower fault-free valve branches (T1, T3 ... T6) a number of fault-free subsystems (10T1, 10T3 ... 10T6) corresponding to the at least one failed subsystem (10T2) such that terminal voltages of the controlled fault-free subsystems (10T1, 10T3—. 10-r6) are also permanently zero.

2. A method for controlling an inverter having at least two phase modules, with each phase module having an upper valve branch and a lower valve branch, and with each valve branch having at least three two-pole subsystems connected in series, with the following method steps in the event of failure of at least one subsystem in a faulty valve branch of a defective phase module:
 a) identifying the faulty valve branch in the identified defective phase module in which one or more subsystems have failed;
 b) controlling a terminal voltage of the one or more failed subsystems in the faulty valve branch so as to be permanently zero; and
 c) controlling each of the upper and lower fault-free valve branches having fault-free subsystems; a number of fault-free subsystems corresponding to the one or more failed subsystems such that terminal voltages of the controlled fault-free subsystems are permanently zero.

* * * * *

UNITED STATES PATENT AND TRADEMARK OFFICE
CERTIFICATE OF CORRECTION

PATENT NO. : 8,611,114 B2
APPLICATION NO. : 13/057595
DATED : December 17, 2013
INVENTOR(S) : Marc Hiller et al.

It is certified that error appears in the above-identified patent and that said Letters Patent is hereby corrected as shown below:

In the Claims:

Column 7, claim 1, line 19: Please change "10-1-2 in a fault~ valve" to --10T2 in a faulty valve--.

Column 8, claim 1, line 6: Please change "10-r6" to --10T6--.

Signed and Sealed this
Twenty-second Day of July, 2014

Michelle K. Lee
*Deputy Director of the United States Patent and Trademark Office*